(12) United States Patent
Mahler

(10) Patent No.: US 8,080,079 B2
(45) Date of Patent: Dec. 20, 2011

(54) AIR FILTER HOUSING WITH GUIDES FOR AIR FILTER UNITS

(75) Inventor: Axel Mahler, Reinfeld (DE)

(73) Assignee: Camfil AB, Trosa (SE)

( * ) Notice: Subject to any disclaimer, the term of this patent is extended or adjusted under 35 U.S.C. 154(b) by 624 days.

(21) Appl. No.: 12/278,639

(22) PCT Filed: Mar. 14, 2006

(86) PCT No.: PCT/SE2006/050028
§ 371 (c)(1),
(2), (4) Date: Nov. 12, 2008

(87) PCT Pub. No.: WO2007/106002
PCT Pub. Date: Sep. 20, 2007

(65) Prior Publication Data
US 2009/0064645 A1    Mar. 12, 2009

(51) Int. Cl.
*B01D 45/00* (2006.01)
(52) U.S. Cl. ............ 55/480; 55/481; 55/478; 55/482; 55/483; 55/490; 55/493; 55/502; 55/506
(58) Field of Classification Search .............. 55/480, 55/481, 478, 482, 483, 490, 493, 502, 506
See application file for complete search history.

(56) References Cited

U.S. PATENT DOCUMENTS

| | | | |
|---|---|---|---|
| 3,246,456 A | 4/1966 | Sharp | |
| 3,247,652 A | 4/1966 | Annas et al. | |
| 3,494,113 A | 2/1970 | Kinney | |
| 3,626,668 A * | 12/1971 | Cardiff | 96/58 |
| 5,458,667 A * | 10/1995 | Poggi et al. | 55/480 |
| 5,494,497 A * | 2/1996 | Lee | 55/480 |
| 5,669,947 A * | 9/1997 | Diachuk | 55/342 |
| 5,788,729 A * | 8/1998 | Jurgensmeyer | 55/496 |
| 6,099,612 A * | 8/2000 | Bartos | 55/481 |
| 6,264,713 B1 * | 7/2001 | Lewis, II | 55/481 |
| 6,974,491 B1 * | 12/2005 | Kendall | 55/493 |

FOREIGN PATENT DOCUMENTS
EP    1 433 514    6/2004

OTHER PUBLICATIONS

Nov. 21, 2006 International Search Report of corresponding PCT/SE2006/050028.

* cited by examiner

*Primary Examiner* — Jason M Greene
*Assistant Examiner* — Dung H Bui
(74) *Attorney, Agent, or Firm* — Young & Thompson

(57) ABSTRACT

An air filter housing (1) has at least one filter chamber (2, 3) with an inlet end and an outlet end for air passing through a filter unit (F) disposed in the filter chamber, an access opening (4, 5) arranged in a sidewall of the filter chamber for the introduction of an air filter unit into and removal thereof out of the filter chamber, and a clamping device (8) for pressing an air filter unit disposed in the filter chamber against an end wall of the filter chamber in the inlet end thereof. The housing has a guide (19, 20, 21-24) for guiding an air filter unit (F) during introduction into and removal out of the filter chamber (2).

9 Claims, 2 Drawing Sheets

AIR FILTER HOUSING WITH GUIDES FOR AIR FILTER UNITS

TECHNICAL FIELD

The present invention relates to an air filter housing having at least one filter chamber with an inlet end and an outlet end for air passing through a filter unit disposed in said filter chamber, an access opening arranged in a sidewall of said filter chamber for the introduction of an air filter unit into and removal thereof out of said filter chamber, and a clamping device for pressing an air filter unit disposed in the filter chamber against an end wall of said filter chamber in the inlet end thereof. The invention also relates to an air filter unit adapted to be used in such an air filter housing.

BACKGROUND OF THE INVENTION

Filter housings according to the introduction are known from filtering devices for certain laboratories or the like in which there is a risk that the ambient air will be contaminated. In order to prevent air from such environment to leak out, such laboratories often are set under sub-pressure. The function of the filter is to capture all infectious particles or other contaminations, such as bugs or other air carried infectious organisms, in the circulated air. There is thus a risk that the filter unit will contain dangerous contaminations after the filtering device has been in operation. Before changing a filter unit it must therefore be ensured that the possible contaminations captured therein no longer are dangerous to human beings. This is done by letting a decontamination gas pass through the filter unit in order to kill all bacteria or other infectious or contagious organisms or the like. It is therefore essential that the air or gas pass through the filter unit and not outside thereof. In order to ensure that air to be filtered or decontamination gas pass only through the air filter unit, sealing elements are arranged between the respective end of the filter unit and an end wall of the filter chamber and the clamping device, respectively.

However, the persons changing taken out a used filter unit and substituting the removed air filter unit by a fresh one are often dressed in uncomfortable protective clothing so that their movements are rather awkward and clumsy. There is therefore a great risk that the air filter unit or the sealing elements thereof be damaged during introduction of the unit into a filter chamber, especially if the air flow is vertical in the filter housing.

An objective of the present invention is to reduce the risk for damaging an air filter unit during introduction thereof into a filter chamber. Another objective is to facilitate introduction of and change of air filter units in a filter chamber in an air filter housing.

SUMMARY OF THE INVENTION

These objectives are accomplished by an air filter housing having at least one filter chamber with an inlet end and an outlet end for air passing through a filter unit disposed in said filter chamber, an access opening arranged in a sidewall of said filter chamber for the introduction of an air filter unit into and removal thereof out of said filter chamber, and a clamping device for pressing an air filter unit disposed in the filter chamber against an end wall of said filter chamber in the inlet end thereof, characterised by a guide for guiding an air filter unit during introduction into and removal out of said filter chamber.

In a preferred embodiment said guide also guides the movement of the air filter unit within a filter chamber and holds an air filter unit distanced from the end walls of said filter chamber during introduction into and removal out of said filter chamber. Said guide can include a rail in two opposite walls of said filter chamber, said rails being extended in a transverse direction relative to the flow direction of the air in the filter housing and to a plane through the access opening to the filter chamber. Preferably, said rails are movable in the flow direction of the air in the filter housing and biased to a first position by a spring force being stronger than the gravitational force of an air filter unit being guided and held in the rails, said air filter unit being distanced from the end walls of said filter chamber in said first position of said rails.

In a second embodiment the flow direction of the air in the housing is vertical and the rails are held in a first position by a flexible element affixed to the clamping device, said air filter unit being distanced from the end walls of said filter chamber in said first position of said rails.

The invention also relates to an air filter unit adapted to be used in an air filter housing as described above, characterised in that it has means for co-operation with guide means in the air filter housing.

In a preferred embodiment the air filter unit has bars on the outside of opposite side walls slidable in rails in side walls in said air filter housing. Advantageously, the ends of said bars are bevelled.

BRIEF DESCRIPTION OF THE DRAWINGS

The invention shall now be described with reference to the enclosed Figures, of which.

DESCRIPTION OF EMBODIMENTS

Figure 1:
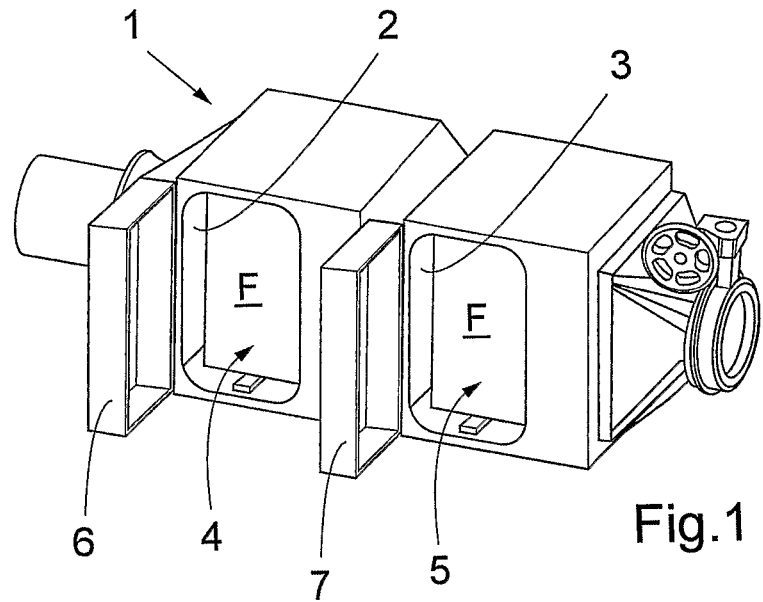
FIG. 1 schematically discloses a perspective view of an air filter housing according to a preferred embodiment of the invention with the doors for the access openings to the two filter chambers being opened, FIG. 2 schematically discloses a partly sectional side view of the air filter housing in FIG. 1, and FIG. 3 discloses a part of FIG. 2 in an enlarged scale.

In FIG. 1, a schematic perspective view of an air filter housing 1 according to a preferred embodiment of the present invention is shown. In the preferred embodiment, the housing includes two filter chambers 2,3 in each of which an air filter unit F is disposed. Access to filter chambers 2,3 is gained by access openings 4,5. These access openings are closable by doors 6,7 shown in their open position in FIG. 1.

Figure 2:
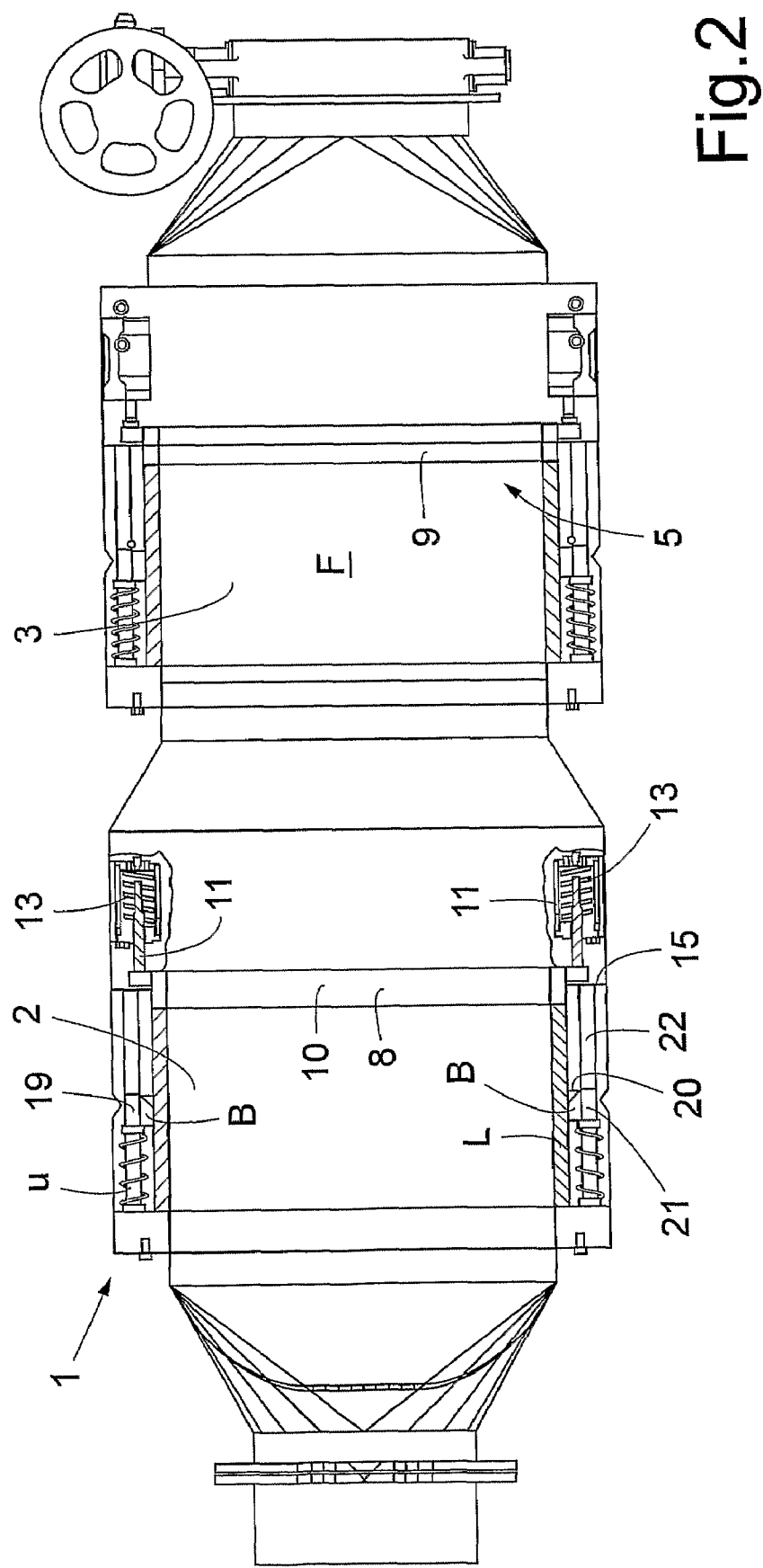

In FIG. 2, the filter housing 1 is shown in a partially sectioned plan view seen from the side of the housing 1 containing the access openings 4,5. The doors 6,7 are not shown in FIG. 2. As can be seen in FIG. 2, each filter unit F comprises a circumferential wall surrounding the filter media and ensuring that air passing through the filter unit will not sidewise leak out of the filter unit but pass through the unit from one end to the other, i.e. in the longitudinal direction of the filter housing 1. In FIG. 2 the upper U and lower part L of this circumferential wall of a filter unit F disposed within filter chamber 2 are shown. When the filter is in operation, the filter units F are held in the filter chambers 2,3 by clamping devices 8 and 9, respectively.

Clamping device 8 consists of a frame 10 which is movable back and forth in the flow direction of the air or gas passing through the filter unit F. In the preferred embodiment shown, the means for moving the frame 10 are four pneumatic cylinders 11, of which two are shown in FIG. 2. These pneumatic cylinders can be disposed in the corners of the rectangular frame 10 or in pairs distanced from the corners on the upper and lower frame parts or the side parts of the frame. It is of course possible, but not preferred, to use more than four pneumatic cylinders and also possible to use three cylinders disposed in a triangular pattern. In FIG. 2 and in FIG. 3 which show a part of the filter housing in FIG. 2 in a larger scale, the frame 10 is shown in its operative position. In its operative position, frame 10 presses the distal end of the filter unit F, i.e. the end being distal from the frame, against a first end wall of the filter chamber 2 and is itself pressed against the proximal end of the filter unit. The filter unit F is provided with sealing elements 12, such as sealing rings or the like, affixed to the opposite ends of the circumferential wall surrounding the filter media. The frame 10 is biased towards the operative position by compression springs 13 acting on the piston of each cylinder 11. The sealing elements 12 on each end of the filter unit F is somewhat compressed due to the compressive force from the springs 13 thereby ensuring that air entering the filter housing can not leak out between the first end wall of the filter chamber 2 and the distal end of the circumferential wall of a filter unit F placed in the filter chamber or between the proximal end of this wall and the frame 10. Each cylinder 11 also contains connections (not shown) to a pressure source for moving the pistons against the force of the springs 13 and thereby move the frame 10 to the right in FIGS. 2 and 3 when a filter unit F placed within the filter chamber 2 is to be discharged and replaced by a fresh filter unit.

A circumferential flange 15 is projecting inwardly from the outer wall of the filter housing 1 in the second end of the filter chamber 2. In the operative position of the frame 10, a portion 16 of the frame 10 is in abutment with the flange 15 via a sealing element 17. The sealing element 17, for example an O-ring, can be affixed to flange 15 or frame 10. By this arrangement it is ensured that air or gas that have passed through the filter unit F placed within the filter chamber 2 can not enter the space outside the circumferential wall of the filter unit, i.e. the space to the left of flange 15 in FIG. 3 or the space between the first end wall of the filter chamber and the flange 15 in FIG. 2. This space contains the access opening 4 to the filter chamber. Thereby it is ensured that no contaminated air or decontamination gas will leak out of the access opening during operation of the filter or thereafter even if the sealing of the access opening is not tight. A double security is thus obtained.

Figure 3:
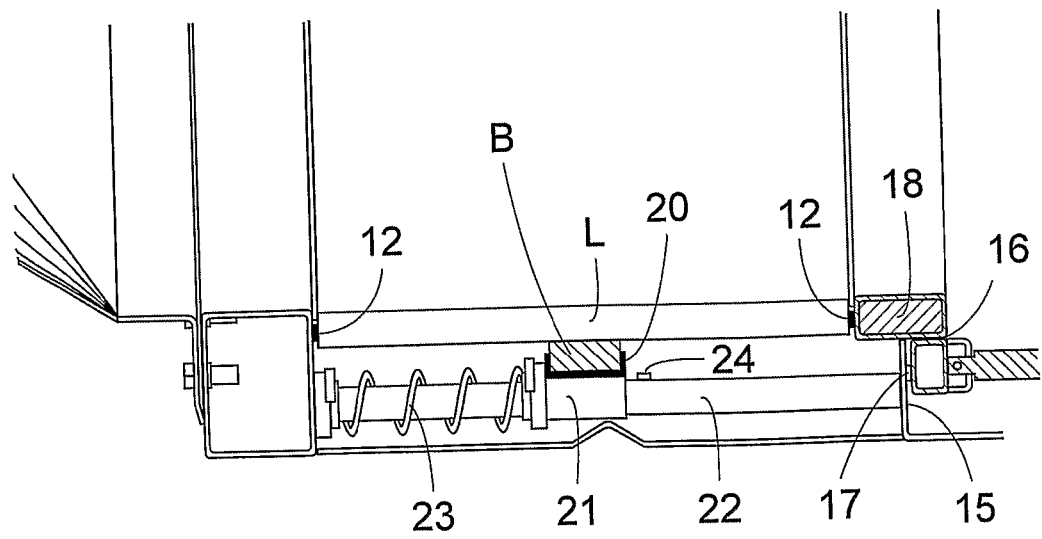

In order to be able to push a filter unit F towards the end wall of the filter chamber 2, i.e. to the left in FIGS. 1-3, the frame 10 has a first tubular part 18 having an outer circumference smaller than an inner circumference of the circumferential flange 15 and a second tubular part 16 having an outer circumference larger than the inner circumference of the circumferential flange 15, the second tubular part having a smaller longitudinal extension than the first tubular part 18 and being disposed in the portion of the frame 10 being proximal to the pneumatic cylinders 11. Thereby, the part 18 can be moved in the longitudinal direction without being obstructed by the flange 15. The width of the second tubular part 16 is chosen such as the O-ring 17 is compressed when the frame 10 is in operative position pressing the filter unit F against the first end wall of the filter chamber 2.

The second filter chamber 3 is constructed the same way as filter chamber 2 and includes also a clamping device similar to the clamping device 10,11 described above.

The filter housing of the present invention also comprises means for guiding a filter unit in the filter chamber. As best seen in FIGS. 2 and 3, the filter chamber is provided with an upper rail 19 and a lower rail 20 which are extended in a transverse direction relative the air flow in the filter unit F, i.e. perpendicular to the plane of the access opening 4. It is to be noted that the terms "upper" and "lower" relates to a horizontal location of the filter housing as disclosed in the Figures, i.e. the air flow through the filter unit being horizontal. However, the air filter housing shown can instead be disposed in a vertical position, i.e. with a vertical flow of air through the filter unit, whereby the rails 19 and 20 then will be disposed in opposite side walls of the filter chamber. The rails 19,20 are in each end portion attached to a sleeve 21 which in turn is slidably supported by a rod 22 extending in the longitudinal direction and affixed in one end to the flange 15 and in the other end to an end wall in the inlet end of the filter chamber 2. A compression spring 23 is disposed between said sleeve 21 and the end wall in the inlet end of the filter chamber 2 and urge the sleeve and thereby the respective rail 19, 20 to move to the right in FIGS. 2 and 3. A stop element 24 is affixed to the rod 22 in order to prevent the spring 23 from moving the sleeve 21 to the right thereof. Filter units F to be placed within filter chambers 2 and 3 are on opposite side walls provided with bars B or the like which are slidable in the rails 19,20. When the respective sleeve 21 holding the rails 19, 20 are urged against the stop element 24, the rails will be disposed in the middle of the filter chamber in a longitudinal direction.

The rods 22 are preferably rectangular in cross-section but other shapes is of course possible, such as circular. They can consist of solid material but are preferably tubular. In the shown embodiment, the rods 22 are extended from an end wall of the filter chamber to the flange 15 but the rods need not reach longer than to the stop element 24, the end of the rod then functioning as a stop element. The rails 19,20 are in the preferred embodiment simple U-girders but any type of guide rail can of course be used. In the shown example only one rail is arranged on each of the opposite side walls but two or more rails can of course be used. However, one rail is preferred in order to facilitate introduction of a fresh filter unit F into the filter chamber.

The guide means for a filter unit function in the following way. When a used filter is to be discharged and substituted by a fresh one, the pneumatic cylinders 11 of the clamping device 8 are activated and the frame 10 will be moved out of its operative position, i.e. to the right in the Figures, against the force of the springs 13 of the clamping device. Thereby the springs 23 of the guide means are free to urge the rails 19,20 and thereby the used filter unit F to the right in the Figures until the sleeves 21 abut the stop elements 24. the filter unit will then be disposed longitudinally in the middle of the filter chamber 2 and its sealing elements 12 will be out of contact with both the frame 10 and the end wall in the inlet end of chamber 2. The used filter unit F is now easy to take out of the filter chamber through the access opening 4. By the co-operation between the bars B and the rails 19,20 it is ensured that the filter unit F will move in a direction perpendicular to the plane of the access opening 4.

After the used filter unit F has been removed, a fresh filter unit F is to be introduced into the filter chamber 2. This is done by placing the end of the bars B of the fresh filter unit F in the respective rail 19,20 and then pushing the fresh filter unit F into the filter chamber 2. Due to co-operation between the bars B and the rails 19,20 the fresh filter unit F will, guided by the rails, move in a path perpendicular to a plane through the access opening 4. In order to ascertain that the rails 19,20 will be held in a longitudinally middle position by the springs 23 even if the filter housing should be placed in a vertical position, the force of these springs shall preferably be stronger than the gravitational force of the filter unit F. The ends of the bars B could be bevelled in order to further facilitate introduction of a filter unit into the filter chamber. Furthermore, the ends of the rails 19,20 opposite to the access opening 4 can have stop elements stopping the movements of bars B and thereby the air filter unit F before it reaches the side wall of the filter chamber opposite to the side wall containing the access opening.

When the fresh air filter unit F has been placed in the middle of the filter chamber, the pneumatic cylinders 11 are de-activated. The springs 13 will then move the pistons of the cylinders 11 and thereby the frame 10 to the left in the Figures. The frame 10 will in turn move the air filter unit F to the left in the Figures until it abut the end wall of the filter chamber in the inlet end thereof. The filter unit F will move only in a strict longitudinal direction due to the positive guiding of the sleeves 21 on the rods 22.

The force of the springs 13 of the clamping device is much stronger than the force of springs 23 of the guiding device in order to ensure a suitable compression of the sealing elements 12 of the filter unit F in the operative position of thereof.

Instead of arranging springs 23 to perform the return movement of the filter unit from an operative position to a discharge position, this movement could be coupled to the movement of the frame 10. A flexible elongate element having a length corresponding to the distance between the bar B and the frame 10 when the frame is brought to inoperative position by the pneumatic cylinders 11 of the clamping device could be attached by its ends to the frame and the bar, respectively. When the frame is brought to operative position such a flexible element has to bend a little in order to allow compression of the sealing elements on the air filter unit by the clamping device. Such a coupling to the frame will also function if the housing is placed in a vertical position.

The described embodiments can of course be modified by skilled men in several ways within the scope of the present invention. For example, the rails can be supported by more than the described two rods, i.e. by one or more rods between the described rods disposed in the end portion of the rails. The rails can have friction-reducing linings or the like or other friction-reducing means.

The invention claimed is:

1. An air filter housing (1) comprising:
   at least one filter chamber (2,3) with an inlet end and an outlet end for air passing through a filter unit (F) disposed in said filter chamber;
   an access opening (4,5) arranged in a sidewall of said filter chamber for the introduction of an air filter unit into and removal thereof out of said filter chamber;
   a clamping device (8) for pressing an air filter unit disposed in the filter chamber against an end wall of said filter chamber in the inlet end thereof; and
   a guide (19,20,21-24) for guiding an air filter unit (F) during introduction into and removal out of said filter chamber (2), wherein said guide (19,20,21-24) guides the movement of the air filter unit (F) within a filter chamber (2),
   wherein said guide (19,20,21-24) holds an air filter unit (F) distanced from the end walls of said filter chamber (2) during introduction into and removal out of said filter chamber,
   wherein said guide (19,20,21-24) include a rail (19,20) in two opposite walls of said filter chamber, said rails being extended in a transverse direction relative to the flow direction of the air in the filter housing and to a plane through the access opening (4) to the filter chamber,
   wherein said rails (19,20) are movable in the flow direction of the air in the filter housing.

2. The air filter unit (F) adapted to be used in an air filter housing (1) according to claim 1, further comprising:
   means (B) for co-operation with guide means in the air filter housing.

3. The air filter housing (1) according to claim 1, wherein said rails (19,20) are biased to a first position by a spring force being stronger than the gravitational force of an air filter unit (F) being guided and held in the rails, said air filter unit being distanced from the end walls of said filter chamber (2) in said first position of said rails.

4. The air filter unit (F) adapted to be used in an air filter housing (1) according to claim 3, further comprising:
   means (B) for co-operation with guide means in the air filter housing.

5. The air filter housing according to claim 1, wherein the flow direction of the air in the housing is vertical and the rails are held in a first position by a flexible element affixed to the clamping device, said air filter unit being distanced from the end walls of said filter chamber in said first position of said rails.

6. The air filter unit (F) adapted to be used in an air filter housing (1) according to claim 5, further comprising:
   means (B) for co-operation with guide means in the air filter housing.

7. The air filter unit (F) adapted to be used in an air filter housing (1) according to claim 1, further comprising:
   bars (B) for co-operation with guide means in the air filter housing.

8. The air filter unit (F) according to claim 7, wherein said bars (B) are on the outside of opposite side walls slidable in rails (19,20) in side walls in said air filter housing (1).

9. The air filter unit (F) according to claim 8, wherein the ends of said bars (B) are bevelled.

* * * * *